(12) United States Patent
Hamano et al.

(10) Patent No.: US 9,607,051 B2
(45) Date of Patent: Mar. 28, 2017

(54) EFFECT ANALYSIS METHOD, AND MANAGEMENT DEVICE

(71) Applicant: FUJITSU LIMITED, Kawasaki-shi, Kanagawa (JP)

(72) Inventors: Akihito Hamano, Bunkyo (JP); Satoshi Aita, Kawasaki (JP); Toshiki Okochi, Ohta (JP); Ryu Kanehira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 14/462,943

(22) Filed: Aug. 19, 2014

(65) Prior Publication Data

US 2014/0379733 A1 Dec. 25, 2014

Related U.S. Application Data

(63) Continuation of application No. PCT/JP2012/056942, filed on Mar. 16, 2012.

(51) Int. Cl.
  *G06F 17/00* (2006.01)
  *G06F 17/30* (2006.01)
  *G06Q 10/06* (2012.01)

(52) U.S. Cl.
  CPC ........ *G06F 17/3053* (2013.01); *G06Q 10/06* (2013.01)

(58) Field of Classification Search
  CPC ...... G06F 11/008; G06F 11/3616; G06F 8/72; G06F 8/77
  See application file for complete search history.

(56) References Cited

U.S. PATENT DOCUMENTS

| 6,493,717 | B1 | 12/2002 | Junkin |
| 2001/0055390 | A1* | 12/2001 | Hayashi .............. G06T 1/0028 380/220 |
| 2003/0023406 | A1 | 1/2003 | Kataoka |
| 2004/0210421 | A1 | 10/2004 | Kataoka |
| 2006/0190944 | A1* | 8/2006 | Moon .................. G06Q 10/06 718/104 |
| 2013/0268315 | A1* | 10/2013 | Cotton ............... G06Q 30/0201 705/7.29 |

FOREIGN PATENT DOCUMENTS

| JP | 2003-044275 | 2/2003 |
| JP | 2008-033545 | 2/2008 |
| JP | 2008-217285 | 9/2008 |
| JP | 2011-040961 | 2/2011 |
| JP | 2011-150480 | 8/2011 |

OTHER PUBLICATIONS

International Search Report mailed Jun. 26, 2012 in corresponding International Application PCT/JP2012/056942.

* cited by examiner

*Primary Examiner* — Truong Vo
(74) *Attorney, Agent, or Firm* — Staas & Halsey LLP

(57) ABSTRACT

An effect analyzing program causes a management device that manages a plurality of resources to perform an operation to acquire, from a database that is used during an operation, the information on the resource and the information on a user who uses the resource, analyze the effect on a user due to a task during the task on the resource based on the acquired information on the resource and the acquired information on the user, and output the analyzed degree of effect, the acquired information on the resource and the acquired information on the user, whereby it is possible for an operator to efficiently determine the effect on a user due to a task performed on a resource.

6 Claims, 18 Drawing Sheets

FIG.2

| IDENTIFICATION NUMBER (11a) | RESOURCE ID (11b) | RESOURCE NAME (11c) | STATUS (11d) | REDUNDANCY STATUS (11e) |
|---|---|---|---|---|
| 1 | R111111 | server001 | UP | Standby |
| 2 | R222222 | server222 | UP | Active |
| ⋮ | ⋮ | ⋮ | ⋮ | ⋮ |

| IDENTIFICATION NUMBER (12a) | USER ID (12b) | SYSTEM ID (12c) | IN-USE RESOURCE ID (12d) |
|---|---|---|---|
| 1 | AAAAAAAAAA | S123456 | R111111 |
| 2 | BBBBBBBBBB | S987654 | R222222 |
| ⋮ | ⋮ | ⋮ | ⋮ |

| IDENTIFICATION NUMBER ₅13a | RESOURCE ID ₅13b | CPU UTILIZATION ₅13c | MEMORY UTILIZATION ₅13d |
|---|---|---|---|
| 1 | R111111 | 1% | 1% |
| 2 | R222222 | 20% | 30% |
| ⋮ | ⋮ | ⋮ | ⋮ |

| IDENTIFICATION NUMBER ₅14a | USER ID ₅14b | SYSTEM ID ₅14c | BILLING DATE ₅14d | BILLING AMOUNT ₅14e |
|---|---|---|---|---|
| 1 | AAAAAAAAAA | S123456 | 2011/9/5 | JPY 999,999 |
| 2 | BBBBBBBBBB | S987654 | 2011/9/5 | JPY 99,999 |
| ⋮ | ⋮ | ⋮ | ⋮ | ⋮ |

| | 15a | 15b | 15c | 15d | 15e | 15f | 15g |
|---|---|---|---|---|---|---|---|
| | IDENTIFI-CATION NUMBER | INCIDENT ID | RESOURCE ID | OCCUR-RENCE TIME AND DATE | EVENT | EFFECT | EFFECT TIME |
| | 1 | I000009 | R111111 | 2010/12/2 | DISK CAPACITY EXCEEDS THRESHOLD | AB-SENCE | 0 MINUTE |
| | 2 | I000888 | R222222 | 2011/5/15 | COMMUNICA-TION FAILURE | PRES-ENCE | 5 MINUTES |
| | ⋮ | ⋮ | ⋮ | ⋮ | ⋮ | ⋮ | ⋮ |

FIG.7

| | 16a | 16b | 16c | 16d | 16e | 16f | 16g |
|---|---|---|---|---|---|---|---|
| | IDENTIFI-CATION NUMBER | RELEASE ID | RESOURCE ID | RELEASE TIME AND DATE | DETAILS | EFFECT | EFFECT TIME |
| | 1 | CH00011 | R111111 | 2010/10/3 | ACL CHANGE TASK | AB-SENCE | 0 MINUTE |
| | 2 | CH00222 | R222222 | 2011/4/25 | PATCH APPLICATION TASK | PRES-ENCE | 5 MINUTES |
| | ⋮ | ⋮ | ⋮ | ⋮ | ⋮ | ⋮ | ⋮ |

| IDENTIFICATION NUMBER (17a) | USER ID (17b) | SYSTEM ID (17c) | OPERATING RATE (17d) |
|---|---|---|---|
| 1 | AAAAAAAAAA | S123456 | 99.99% |
| 2 | BBBBBBBBBB | S987654 | 99.91% |
| ⋮ | ⋮ | ⋮ | ⋮ |

| REDUNDANCY CONFIGURATION (181a) | SCORE (181b) |
|---|---|
| WITHOUT REDUNDANCY | 3 |
| OPERATING | 2 |
| STANDBY | 1 |

| NUMBER OF USERS | SCORE |
|---|---|
| EQUAL TO OR MORE THAN 100 | 3 |
| EQUAL TO OR MORE THAN 50 AND LESS THAN 100 | 2 |
| LESS THAN 50 | 1 |

| UTILIZATION | SCORE |
|---|---|
| EQUAL TO OR MORE THAN 90 | 3 |
| EQUAL TO OR MORE THAN 60 AND LESS THAN 90 | 2 |
| LESS THAN 60 | 1 |

| BILLING AMOUNT (184a) | SCORE (184b) |
|---|---|
| EQUAL TO OR MORE THAN 1 MILLION | 3 |
| EQUAL TO OR MORE THAN 0.5 MILLION AND LESS THAN 1 MILLION | 2 |
| LESS THAN 0.5 MILLION | 1 |

| EFFECT TIME (185a) | SCORE (185b) |
|---|---|
| EQUAL TO OR MORE THAN 60 MINUTES | 3 |
| EQUAL TO OR MORE THAN 5 MINUTES AND LESS THAN 60 MINUTES | 2 |
| LESS THAN 5 MINUTES | 1 |

| EFFECT TIME | SCORE |
|---|---|
| EQUAL TO OR MORE THAN 60 MINUTES | 3 |
| EQUAL TO OR MORE THAN 5 MINUTES AND LESS THAN 60 MINUTES | 2 |
| LESS THAN 5 MINUTES | 1 |

| OPERATING RATE | SCORE |
|---|---|
| LESS THAN 99.9 | 3 |
| EQUAL TO OR MORE THAN 99.9 AND LESS THAN 99.95 | 2 |
| EQUAL TO OR MORE THAN 99.95 | 1 |

| 19a | 19b | 19c |
|---|---|---|
| IDENTIFICATION NUMBER | DEGREE OF EFFECT | THRESHOLD |
| 1 | HIGH | EQUAL TO OR MORE THAN 8 |
| 2 | MEDIUM | EQUAL TO OR MORE THAN 3 AND EQUAL TO OR LESS THAN 7 |
| 3 | LOW | EQUAL TO OR MORE THAN 0 AND EQUAL TO OR LESS THAN 2 |

BEFORE UPDATE

| BILLING AMOUNT (184a) | SCORE (184b) |
|---|---|
| EQUAL TO OR MORE THAN 1 MILLION | 3 |
| EQUAL TO OR MORE THAN 0.5 MILLION AND LESS THAN 1 MILLION | 2 |
| LESS THAN 0.5 MILLION | 1 |

⇒

184

AFTER UPDATE

| BILLING AMOUNT (184a) | SCORE (184b) |
|---|---|
| EQUAL TO OR MORE THAN 1.5 MILLION | 3 |
| EQUAL TO OR MORE THAN 1 MILLION AND LESS THAN 1.5 MILLION | 2 |
| LESS THAN 1 MILLION | 1 |

BEFORE UPDATE

| NUMBER OF USERS (182a) | SCORE (182b) |
|---|---|
| EQUAL TO OR MORE THAN 100 | 3 |
| EQUAL TO OR MORE THAN 50 AND LESS THAN 100 | 2 |
| LESS THAN 50 | 1 |

⇒

182

AFTER UPDATE

| NUMBER OF USERS (182a) | SCORE (182b) |
|---|---|
| EQUAL TO OR MORE THAN 500 | 3 |
| EQUAL TO OR MORE THAN 100 AND LESS THAN 500 | 2 |
| LESS THAN 100 | 1 |

EFFECT ANALYSIS METHOD, AND MANAGEMENT DEVICE

CROSS-REFERENCE TO RELATED APPLICATION(S)

This application is a continuation of International Application No. PCT/JP2012/056942, filed on Mar. 16, 2012, the entire contents of which are incorporated herein by reference.

FIELD

The embodiment discussed herein is related to a program, or the like.

BACKGROUND

In recent years, cloud computing (hereafter, referred to as a cloud environment) has been used, where multiple computing resources on a network can be used as user's computing resources by using a virtualization technology of servers and networks. In the cloud environment, various resources are shared by multiple users.

In the cloud environment, an operator needs to create documentation of the resources that constitute the cloud environment for management and, each time he/she performs a task on a resource, reads a document to analyze the effect on a user who uses the cloud environment due to the task.

Japanese Laid-open Patent Publication No. 2008-33545

However, the conventional method of reading documents has a problem in that it is difficult for an operator to efficiently determine the effect on a user due to a task performed on a resource. In recent years, the cloud environment has been increasing in size and has been complicated; therefore, the amount of documents to be analyzed is significant. Thus, it is difficult for an operator to efficiently determine the effect on an appropriate user.

SUMMARY

According to an aspect of an embodiment, a non-transitory computer-readable recording medium stores an effect analyzing program. The program causes a management device that manages a plurality of resources to execute a process. The process includes acquiring, from a database that is used during an operation, information on a resource and information on a user who uses the resource. The process includes analyzing an effect on a user due to a task during the task on the resource based on the acquired information on the resource and the acquired information on the user. The process includes outputting a degree of effect that is analyzed at the analyzing, the acquired information on the resource and the acquired information on the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table that illustrates an example of the data structure of resource information according to the embodiment;

FIG. 3 is a table that illustrates an example of the data structure of user information according to the embodiment;

FIG. 4 is a table that illustrates an example of the data structure of performance information according to the embodiment;

FIG. 5 is a table that illustrates an example of the data structure of billing information according to the embodiment;

FIG. 6 is a table that illustrates an example of the data structure of incident information according to the embodiment;

FIG. 7 is a table that illustrates an example of the data structure of release information according to the embodiment;

FIG. 8 is a table that illustrates an example of the data structure of SLA information according to the embodiment;

FIG. 9 is a table that illustrates an example of the data structure of score information that is related to the resource information according to the embodiment;

FIG. 10 is a table that illustrates an example of the data structure of score information that is related to the user information according to the embodiment;

FIG. 11 is a table that illustrates an example of the data structure of score information that is related to the performance information according to the embodiment;

FIG. 12 is a table that illustrates an example of the data structure of score information that is related to the billing information according to the embodiment;

FIG. 13 is a table that illustrates an example of the data structure of score information that is related to the incident information according to the embodiment;

FIG. 14 is a table that illustrates an example of the data structure of score information that is related to the release information according to the embodiment;

FIG. 15 is a table that illustrates an example of the data structure of score information that is related to the SLA information according to the embodiment;

FIG. 16 is a table that illustrates an example of the data structure of threshold information according to the embodiment;

FIG. 18 is a table that illustrates an example of an update to the score information related to the billing information;

FIG. 19 is a table that illustrates an example of an update to the score information related to the user information;

DESCRIPTION OF EMBODIMENTS

Preferred embodiments of the present invention will be explained with reference to accompanying drawings. An explanation is given of a case where the management device is applied to cloud computing; however, the present invention is not limited to the embodiment.

Configuration of a Management Server according to an Embodiment

Figure 1:
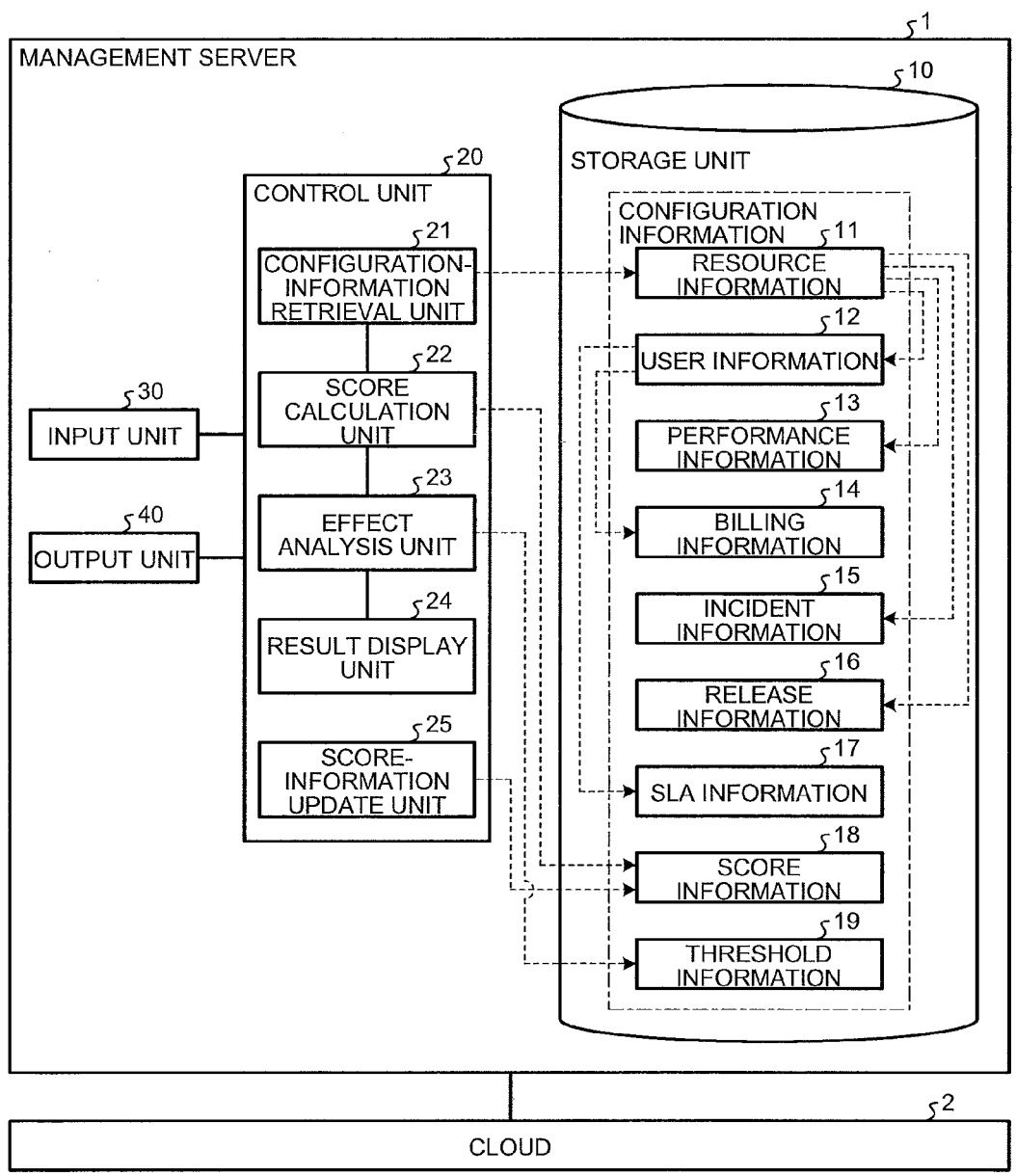
FIG. 1 is a functional block diagram that illustrates a configuration of a management server according to an embodiment.

FIG. 1 is a functional block diagram that illustrates a configuration of a management server according to an embodiment. As illustrated in FIG. 1, a management server 1 manages a plurality of resources on a cloud 2. The cloud 2 means an environment where a plurality of resources on a network can be shared as user's computing resources. The resources on the cloud 2 include, for example, physical machines or routers.

The management server 1 acquires, from a database that is used during an operation, the information on the resource that is a task object and the information on a user who uses the resource, and it uses the acquired information to analyze the effect on a user due to a task on the resource that is a task object. The management server 1 then outputs an analysis result. The database that is used during an operation corresponds to the configuration information that is stored in a storage unit 10 that will be described later. The management server 1 further includes the storage unit 10, a control unit 20, an input unit 30, and an output unit 40.

The input unit 30 corresponds to a keyboard, mouse, microphone, or the like, through which the name, or the like, of the resource that is a task object is input. The output unit 40 corresponds to a display (or a monitor or a touch panel) through which the degree of effect on a user due to a task on a resource, or the like, is output.

The storage unit 10 corresponds to a storage device, for example, a non-volatile semiconductor memory device such as a Flash Memory or FRAM (registered trademark) (Ferroelectric Random Access Memory). Furthermore, the storage unit 10 stores, as the configuration information that is used during an operation, resource information 11, user information 12, performance information 13, billing information 14, incident information 15, release information 16, SLA (Service Level Agreement) information 17, score information 18, and threshold information 19. Out of the pieces of configuration information in the storage unit 10, the resource information 11, the performance information 13, the incident information 15, and the release information 16 are given as examples of the information on a resource. Out of the pieces of configuration information in the storage unit 10, the user information 12, the billing information 14, and the SLA information 17 are given as examples of the information on a user.

The resource information 11 is the information that indicates a plurality of resources on the cloud 2. The user information 12 is the information that indicates a user who uses a resource. The performance information 13 is the information that indicates the performance of a resource. The billing information 14 is the information that indicates the bill on a user who uses a resource. The incident information 15 is the information that indicates a past incident that has occurred in a resource. Here, an incident means a past event that could have significantly affected a resource. The release information 16 indicates the information during a past release for a resource, for example, the information during a version upgrade. The SLA information 17 is the information on the SLA of a user who uses a resource. Here, the SLA means the agreement that is made between a provider (e.g., an operator) of a service and a user with regard to the service level. The SLA defines that the service operating rate of, for example, 99.99% is assured. The score information 18 is the information that has a previously obtained score for the effect on a user due to a task on a resource, and it is generated with respect to each piece of configuration information. The threshold information 19 is the information that indicates a threshold that is used for analysis of the effect on a user due to a task on a resource.

Here, an explanation is given, with reference to FIGS. 2 to 15, of the data structures of various types of information. FIG. 2 is a table that illustrates an example of the data structure of the resource information according to the embodiment. As illustrated in FIG. 2, the resource information 11 is stored such that an identification number 11a, a resource ID 11b, a resource name 11c, a status 11d, and a redundancy status 11e are related to one another. The identification number 11a indicates the number for identifying individual resource information. The resource ID 11b indicates the ID (Identification) of a resource. The resource name 11c indicates the name of a resource. The status 11d indicates the operating status of a resource. If the operating status is being operating, for example, "UP" is set. If the operating status is not being operating, for example "DOWN" is set. The redundancy status 11e indicates either operating or standby in the redundancy configuration. If it is operating, for example, "Active" is set. If it is standby, for example, "Standby" is set. For example, if the identification number 11a is "1", "R111111" is stored as the resource ID 11b, "server001" as the resource name 11c, "UP" as the status 11d, and "Standby" as the redundancy status 11e.

FIG. 3 is a table that illustrates an example of the data structure of the user information according to the embodiment. As illustrated in FIG. 3, the user information 12 is stored such that an identification number 12a, a user ID 12b, a system ID 12c, and an in-use resource ID 12d are related to one another. The identification number 12a indicates the number for identifying individual user information. The user ID 12b indicates the ID of a user. The system ID 12c indicates the ID of the system that is used by a user. The in-use resource ID 12d indicates the ID of the resource that is used by a user. For example, if the identification number 12a is "1", "AAAAAAAAAA" is stored as the user ID 12b, "S123456" as the system ID 12c, and "R111111" as the in-use resource ID 12d.

FIG. 4 is a table that illustrates an example of the data structure of the performance information according to the embodiment. As illustrated in FIG. 4, the performance information 13 is stored such that an identification number 13a, a resource ID 13b, CPU utilization 13c, and memory utilization 13d are related to one another. The identification number 13a indicates the number for identifying individual performance information. The resource ID 13b indicates the ID of a resource. The CPU utilization 13c indicates the utilization of a CPU in a resource. The memory utilization 13d indicates the utilization of a memory in a resource. For example, if the identification number 13a is "1", "R111111" is stored as the resource ID 13b, "1%" as the CPU utilization 13c, and "1%" as the memory utilization 13d.

FIG. 5 is a table that illustrates an example of the data structure of the billing information according to the embodiment. As illustrated in FIG. 5, the billing information 14 is stored such that an identification number 14a, a user ID 14b, a system ID 14c, a billing date 14d, and a billing amount 14e are related to one another. The identification number 14a indicates the number for identifying individual billing information. The user ID 14b indicates the ID of a user. The system ID 14c indicates the ID of the system that is used by a user. The billing date 14d indicates the billing date of a bill for usage of a system. The billing amount 14e indicates the amount of bill that is charged. For example, if the identification number 14a is "1", "AAAAAAAAAA" is stored as the user ID 14b, "S123456" as the system ID 14c, "2011/9/5" as the billing date 14d, and "JPY 999,999" as the billing amount 14e.

FIG. 6 is a table that illustrates an example of the data structure of the incident information according to the embodiment. As illustrated in FIG. 6, the incident information 15 is stored such that an identification number 15a, an incident ID 15b, a resource ID 15c, an occurrence time and date 15d, an event 15e, an effect 15f, and an effect time 15g are related to one another. The identification number 15a indicates the number for identifying individual incident information. The incident ID 15b indicates the ID for identifying an incident. The resource ID 15c indicates the ID of a resource where an incident occurs. The occurrence time and date 15d indicates the occurrence time and date of an incident. The event 15e indicates the specific details of an incident. The effect 15f indicates the presence or absence of effects on a user. If there is an effect, for example, "presence" is set. If there is no effect, for example, "absence" is set. The effect time 15g indicates the time during which there is an effect. For example, if the identification number 15a is "2", "I000888" is stored as the incident ID 15b, and "R222222" as the resource ID 15c. Furthermore, "2011/5/15" is stored as the occurrence time and date 15d, "communication failure" as the event 15e, "presence" as the effect 15f, and "5 minutes" as the effect time 15g.

FIG. 7 is a table that illustrates an example of the data structure of the release information according to the embodiment. As illustrated in FIG. 7, the release information 16 is stored such that an identification number 16a, a release ID 16b, a resource ID 16c, a release time and date 16d, details 16e, an effect 16f, and an effect time 16g are related to one another. The identification number 16a indicates the number for identifying individual release information. The release ID 16b indicates the ID for identifying a release. The resource ID 16c indicates the ID of a resource for which a release is made. The release time and date 16d indicates the time and date of a release. The details 16e indicate the details of a release. The effect 16f indicates the presence or absence of effect on a user. If there is an effect, for example, "presence" is set. If there is no effect, for example, "absence" is set. The effect time 16g indicates the time during which there is an effect. For example, if the identification number 16a is "2", "CH00222" is stored as the release ID 16b, and "R222222" as the resource ID 16c. Furthermore, "2011/4/25" is stored as the release time and date 16d, "patch application task" as the details 16e, "presence" as the effect 16f, and "5 minutes" as the effect time 16g.

FIG. 8 is a table that illustrates an example of the data structure of the SLA information according to the embodiment. As illustrated in FIG. 8, the SLA information 17 is stored such that an identification number 17a, a user ID 17b, a system ID 17c, and an operating rate 17d are related to one another. The identification number 17a indicates the number for identifying individual SLA information. The user ID 17b indicates the ID of a user. The system ID 17c indicates the system ID of the system that is used by a user. The operating rate 17d indicates the service operating rate for a user. For example, if the identification number 17a is "1", "AAAAAAAAAA" is stored as the user ID 17b, "S123456" as the system ID 17c, and "99.99%" as the operating rate 17d.

FIG. 9 is a table that illustrates an example of the data structure of the score information that is related to the resource information according to the embodiment. As illustrated in FIG. 9, a score information 181 related to the resource information is stored such that a redundancy configuration 181a and a score 181b are related to each other. The redundancy configuration 181a indicates a distinction as to whether the subject resource is "without redundancy", "operating", or "standby". The score 181b indicates the score that corresponds to the distinction indicated by the redundancy configuration 181a. The score is assigned in accordance with the degree of effect on a user when an operator performs a task on a resource. Here, as the effect on a user is increased, the score value becomes larger. The score value is set in the same manner with respect to the score information other than the score information related to the resource information. For example, if the redundancy configuration 181a is "without redundancy", the score 181b is "3". If the redundancy configuration 181a is "operating", the score 181b is "2". If the redundancy configuration 181a is "standby", the score 181b is "1".

FIG. 10 is a table that illustrates an example of the data structure of the score information that is related to the user information according to the embodiment. As illustrated in FIG. 10, a score information 182 related to the user information is stored such that a number of users 182a and a score 182b are related to each other. The number of users 182a indicates a distinction as to the number of users who use the subject resource. The score 182b indicates the score that corresponds to the distinction that is indicated by the number of users 182a. For example, if the number of users 182a is "equal to or more than 100", the score 182b is "3". If the number of users 182a is "equal to or more than 50 and less than 100", the score 182b is "2". If the number of users 182a is "less than 50", the score 182b is "1".

FIG. 11 is a table that illustrates an example of the data structure of the score information that is related to the performance information according to the embodiment. As illustrated in FIG. 11, a score information 183 related to the performance information is stored such that utilization 183a and a score 183b are related to each other. The utilization 183a indicates a distinction as to the utilization for using the subject resource. The score 183b indicates the score that corresponds to the distinction that is indicated by the utilization 183a. For example, if the utilization 183a is "equal to or more than 90", the score 183b is "3". If the utilization 183a is "equal to or more than 60 and less than 90", the score 183b is "2". If the utilization 183a is "less than 60", the score 183b is "1".

FIG. 12 is a table that illustrates an example of the data structure of the score information that is related to the billing information according to the embodiment. As illustrated in FIG. 12, a score information 184 related to the billing information is stored such that a billing amount 184a and a score 184b are related to each other. The billing amount 184a indicates a distinction as to the billing amount of the bill on a user who uses the subject resource. The score 184b indicates the score that corresponds to the distinction that is indicated by the billing amount 184a. For example, if the billing amount 184a is "equal to or more than 1 million", the score 184b is "3". If the billing amount 184a is "equal to or more than 0.5 million and less than 1 million", the score 184b is "2". If the billing amount 184a is "less than 0.5 million", the score 184b is "1".

FIG. 13 is a table that illustrates an example of the data structure of the score information that is related to the incident information according to the embodiment. As illustrated in FIG. 13, a score information 185 related to the incident information is stored such that an effect time 185a and a score 185b are related to each other. The effect time 185a indicates a distinction as to the effect time due to an incident that occurs in the subject resource. The score 185b indicates the score that corresponds to the distinction that is indicated by the effect time 185a. For example, if the effect time 185a is "equal to or more than 60 minutes", the score 185b is "3". If the effect time 185a is "equal to or more than 5 minutes and less than 60 minutes", the score 185b is "2". If the effect time 185a is "less than 5 minutes", the score 185b is "1".

FIG. 14 is a table that illustrates an example of the data structure of the score information that is related to the release information according to the embodiment. As illustrated in FIG. 14, a score information 186 related to the release information is stored such that an effect time 186a and a score 186b are related to each other. The effect time 186a indicates a distinction as to the effect time due to a release that is made for the subject resource. The score 186b indicates the score that corresponds to the distinction that is indicated by the effect time 186a. For example, if the effect time 186a is "equal to or more than 60 minutes", the score 186b is "3". If the effect time 186a is "equal to or more than 5 minutes and less than 60 minutes", the score 186b is "2". If the effect time 186a is "less than 5 minutes", the score 186b is "1".

FIG. 15 is a table that illustrates an example of the data structure of the score information that is related to the SLA information according to the embodiment. As illustrated in FIG. 15, a score information 187 related to the SLA information is stored such that an operating rate 187a and a score 187b are related to each other. The operating rate 187a indicates a distinction as to the service operating rate for a user. The score 187b indicates the score that corresponds to the distinction that is indicated by the operating rate 187a. For example, if the operating rate 187a is "less than 99.9", the score 187b is "3". If the operating rate 187a is "equal to or more than 99.9 and less than 99.95", the score 187b is "2". If the operating rate 187a is "equal to or more than 99.95", the score 187b is "1".

Returning to FIG. 1, the control unit 20 includes an internal memory that stores programs that define various types of procedures and control data, and it uses them to perform various operations. Furthermore, the control unit 20 corresponds to, for example, an integrated circuit, such as an ASIC (Application Specific Integrated Circuit) or FPGA (Field Programmable Gate Array), or an electronic circuit, such as a CPU (Central Processing Unit) or MPU (Micro Processing Unit). Moreover, the control unit 20 includes a configuration-information retrieval unit 21, a score calculation unit 22, an effect analysis unit 23, a result display unit 24, and a score-information update unit 25.

The configuration-information retrieval unit 21 retrieves, from the configuration information that is used during an operation, the information on the resource that is a task object and the information on a user who uses the resource.

For example, when the name of the resource that is a task object is input, the configuration-information retrieval unit 21 acquires, from the resource information 11, the record that corresponds to the input name of the resource. Specifically, the configuration-information retrieval unit 21 identifies the resource that is a task object. The configuration-information retrieval unit 21 then extracts, from the acquired record of the resource information 11, the resource ID 11b and the redundancy status 11e.

Furthermore, the configuration-information retrieval unit 21 acquires, from the performance information 13, the record that corresponds to the extracted resource ID 11b. The configuration-information retrieval unit 21 then extracts, from the acquired record of the performance information 13, any one or both of the CPU utilization 13c and the memory utilization 13d. Furthermore, the configuration-information retrieval unit 21 acquires, from the incident information 15, the record that corresponds to the extracted resource ID 11b. Then, the configuration-information retrieval unit 21 extracts the effect time 15g from the acquired record of the incident information 15. Furthermore, the configuration-information retrieval unit 21 acquires, from the release information 16, the record that corresponds to the extracted resource ID 11b. Then, the configuration-information retrieval unit 21 extracts the effect time 16g from the acquired record of the release information 16. The information included in the record that is acquired from each of the resource information 11, the performance information 13, the incident information 15, and the release information 16 corresponds to the information on the resource.

Furthermore, the configuration-information retrieval unit 21 acquires, from the user information 12, the record that corresponds to the extracted resource ID 11b. The configuration-information retrieval unit 21 then extracts the user ID 12b and the system ID 12c from the acquired record of the user information 12. In addition, the configuration-information retrieval unit 21 acquires the number of records that are acquired from the user information 12, i.e., the number of users.

Furthermore, with respect to each of the user IDs 12b and the system IDs 12c that are extracted, the configuration-information retrieval unit 21 acquires, from the billing information 14, the record that corresponds to the user ID 12b and the system ID 12c. The configuration-information retrieval unit 21 then extracts the billing amount 14e from the acquired record of the billing information 14. Furthermore, with respect to each of the user IDs 12b and the system IDs 12c that are extracted, the configuration-information retrieval unit 21 acquires, from the SLA information 17, the record that corresponds to the user ID 12b and the system ID 12c. The configuration-information retrieval unit 21 then extracts the operating rate 17d from the acquired record of the SLA information 17. The information included in the record that is acquired from each of the user information 12, the billing information 14, and the SLA information 17 corresponds to the information on a user.

The score calculation unit 22 refers to the score information 18 (181 to 187) related to each piece of configuration information and, with respect to each piece of information that is extracted from each piece of configuration information by the configuration-information retrieval unit 21, obtains a score for the effect on a user due to a task on the resource. Then, the score calculation unit 22 sums the score that is obtained as a score with respect to each piece of configuration information.

For example, the score calculation unit 22 refers to the score information 181 related to the resource information so as to obtain the score 181b that corresponds to the redundancy status 11e that is extracted by the configuration-information retrieval unit 21.

Furthermore, the score calculation unit 22 refers to the score information 183 related to the performance information so as to obtain the score 183b that corresponds to the CPU utilization 13c or the memory utilization 13d that is extracted by the configuration-information retrieval unit 21. If the configuration-information retrieval unit 21 does not extract data on the CPU utilization 13c or the memory utilization 13d, the score calculation unit 22 sets the score related to the performance information to 0 point.

Furthermore, the score calculation unit 22 refers to the score information 185 related to the incident information so as to obtain the score 185b that corresponds to the effect time 15g that is extracted by the configuration-information retrieval unit 21. If the configuration-information retrieval unit 21 does not extract data on the effect time 15g, the score calculation unit 22 sets the score related to the incident information to 0 point.

Furthermore, the score calculation unit 22 refers to the score information 186 related to the release information so as to obtain the score 186b that corresponds to the effect time 16g that is extracted by the configuration-information retrieval unit 21. If the configuration-information retrieval unit 21 does not extract data on the effect time 16g, the score calculation unit 22 sets the score related to the release information to 0 point.

Furthermore, the score calculation unit 22 refers to the score information 182 related to the user information so as to obtain the score 182b that corresponds to the number of users that is acquired by the configuration-information retrieval unit 21. If the number of users that is acquired by the configuration-information retrieval unit 21 is zero, the score calculation unit 22 sets the score related to the user information to 0 point.

Furthermore, the score calculation unit 22 refers to the score information 184 related to the billing information so as to obtain the score 184b that corresponds to the billing amount 14e that is extracted by the configuration-information retrieval unit 21. The billing amount 14e is the data that is extracted with respect to each of the user IDs 14b and the system IDs 14c. The score calculation unit 22 then sums the obtained scores with respect to each of the user IDs 14b and the system IDs 14c. If the configuration-information retrieval unit 21 does not extract the billing amount 14e that corresponds to the user ID 14b and the system ID 14c, the score calculation unit 22 sets the score to 0 point.

Furthermore, the score calculation unit 22 refers to the score information 187 related to the SLA information so as to obtain the score 187b that corresponds to the operating rate 17d that is extracted by the configuration-information retrieval unit 21. The operating rate 17d is the data that is extracted with respect to each of the user IDs 17b and the system IDs 17c. The score calculation unit 22 then sums the obtained scores with respect to each of the user IDs 17b and the system IDs 17c. If the configuration-information retrieval unit 21 does not extract the operating rate 17d that corresponds to the user ID 17b and the system ID 17c, the score calculation unit 22 sets the score to 0 point.

Furthermore, the score calculation unit 22 sums the scores that are calculated with respect to the resource information 11, the performance information 13, the incident information 15, the release information 16, the user information 12, the billing information 14, and the SLA information 17. Specifically, the score calculation unit 22 sums the score that is obtained as a score with respect to each piece of configuration information, thereby obtaining a score for the effect on a user due to a task on the input resource.

The effect analysis unit 23 uses the summary result of summary of the score calculation unit 22 and a threshold in the threshold information 19 to analyze the effect on a user due to a task on the resource. Here, an explanation is given, with reference to FIG. 16, of the data structure of the threshold information 19. FIG. 16 is a table that illustrates an example of the data structure of the threshold information according to the embodiment. As illustrated in FIG. 16, the threshold information 19 is stored such that an identification number 19a, a degree of effect 19b, and a threshold 19c are related to one another. The identification number 19a indicates the number for identifying individual threshold information. The degree of effect 19b means the level of effect, and it indicates a distinction as to whether the level of effect is "high", "medium", or "low". The threshold 19c indicates the threshold that corresponds to the distinction indicated by the degree of effect 19b. Specifically, the threshold 19c is a threshold that is used when the effect analysis unit 23 analyzes the effect on the basis of a summary result of summary of the score calculation unit 22. For example, if the identification number 19a is "1", the degree of effect 19b is "high", and the threshold 19c is "equal to or more than 8". If the identification number 19a is "2", the degree of effect 19b is "medium", and the threshold 19c is "equal to or more than 3 and equal to or less than 7". If the identification number 19a is "3", the degree of effect 19b is "low", and the threshold 19c is "equal to or more than 0 and equal to or less than 2".

Returning to FIG. 1, for example, the effect analysis unit 23 refers to the threshold information 19 to determine the degree of effect 19b that corresponds to the summary result of summary of the score calculation unit 22. Specifically, the effect analysis unit 23 determines whether the degree of effect that corresponds to the summary result is "high", "medium", or "low" as an analysis of the effect on a user due to a task on the resource. For example, it is assumed that the effect analysis unit 23 refers to the threshold information 19 illustrated in FIG. 16. If the summary result of summary of the score calculation unit 22 is 10 points, the effect analysis unit 23 refers to the threshold information 19 and determines that the degree of effect 19b is "high". Furthermore, if the summary result of summary of the score calculation unit 22 is 6 points, the effect analysis unit 23 refers to the threshold information 19 and determines that the degree of effect 19b is "medium". If the summary result of summary of the score calculation unit 22 is 1 point, the effect analysis unit 23 refers to the threshold information 19 and determines that the degree of effect 19b is "low".

The result display unit 24 displays, on the output unit 40, the result of analysis of the effect analysis unit 23. For example, the result display unit 24 displays the degree of effect that is determined by the effect analysis unit 23, the information on a user, and the information on a resource.

Figure 17:
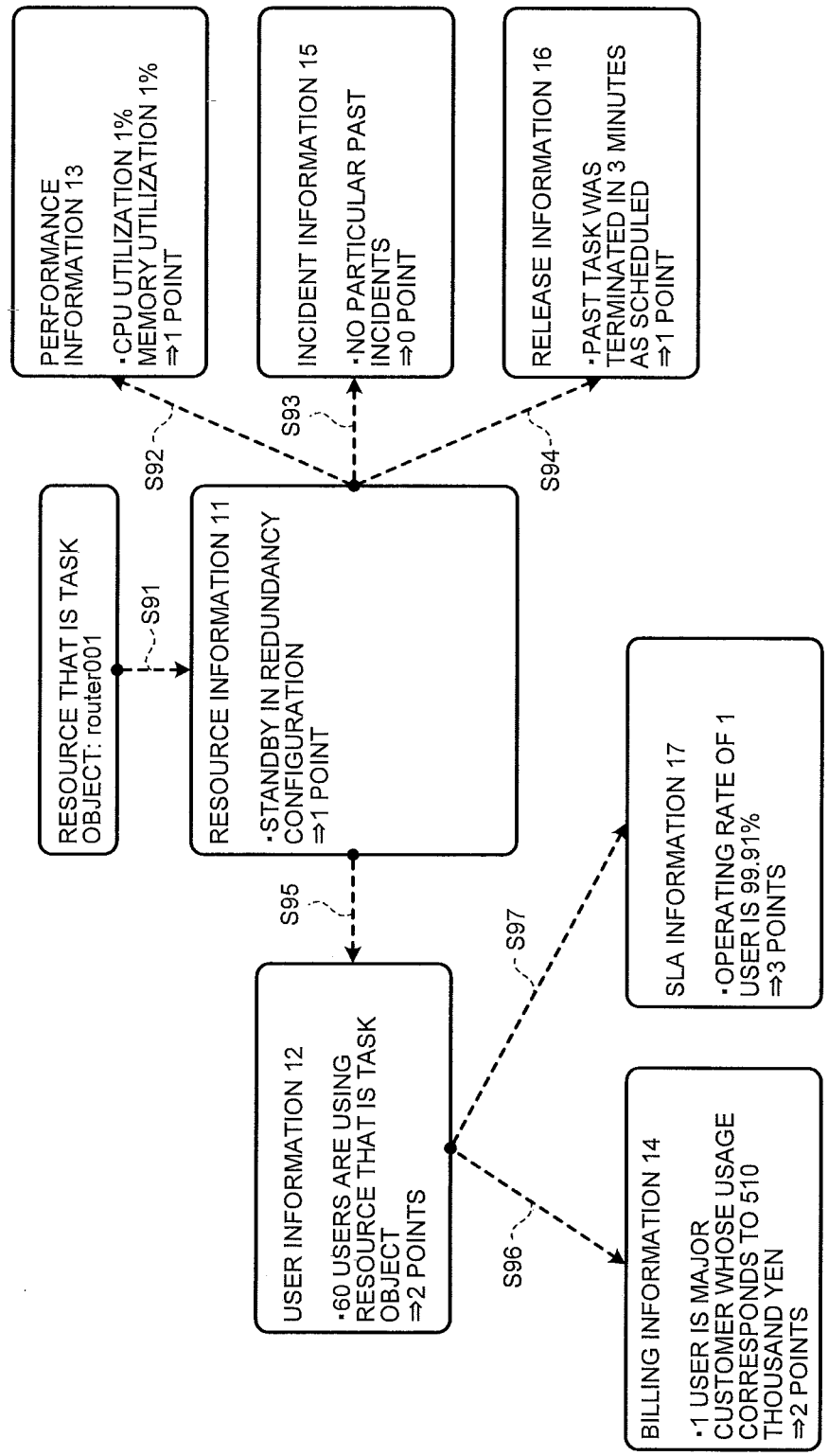
FIG. 17 is a diagram that illustrates a specific example of an effect analysis according to the embodiment.

Here, an explanation is given, with reference to FIG. 17, of a specific example of an effect analysis according to the embodiment. FIG. 17 is a diagram that illustrates a specific example of an effect analysis according to the embodiment. As illustrated in FIG. 17, it is assumed that the resource that is a task object is an externally connected router and the resource name "router001" is input to the configuration-information retrieval unit 21. The configuration-information retrieval unit 21 uses the input resource name as a key to retrieve the corresponding record from the resource information 11 (S91) and extracts the resource ID 11b and the redundancy status 11e from the retrieved record. Here, it is assumed that the extracted redundancy status 11e is "standby".

The configuration-information retrieval unit 21 then uses the extracted resource ID as a key to retrieve the corresponding record from the performance information 13 (S92)

and extracts the CPU utilization 13c and the memory utilization 13d from the retrieved record. Here, it is assumed that the extracted CPU utilization 13c is "1%" and the memory utilization 13d is "1%".

The configuration-information retrieval unit 21 uses the extracted resource ID as a key to retrieve the corresponding record from the incident information 15 (S93) and extracts the effect time 15g from the retrieved record. Here, it is assumed that the corresponding record is not retrieved from the incident information 15, i.e., there are no particular past incidents.

The configuration-information retrieval unit 21 uses the extracted resource ID as a key to retrieve the corresponding record from the release information 16 (S94) and extracts the effect time 16g from the retrieved record. Here, it is assumed that the extracted effect time 16g is "3 minutes".

The configuration-information retrieval unit 21 uses the extracted resource ID as a key to retrieve the corresponding record from the user information 12 (S95) and extracts the user ID 12b and the system ID 12c from the retrieved record. In addition, the configuration-information retrieval unit 21 acquires the number of retrievals that are retrieved from the user information 12. The number of retrievals is the number of users who are using the resource that is a task object. Here, it is assumed that the number of users who are using the resource that is a task object is "60".

The configuration-information retrieval unit 21 then uses the user ID and the system ID that are extracted as keys to retrieve the corresponding record from the billing information 14 (S96) and extracts the billing amount 14e from the retrieved record. Here, it is assumed that the billing amount 14e for one user that corresponds to one user ID and one system ID is "510 thousand".

The configuration-information retrieval unit 21 then uses the user ID and the system ID that are extracted as keys to retrieve the corresponding record from the SLA information 17 (S97) and extracts the operating rate 17d from the retrieved record. Here, it is assumed that the operating rate 17d of one user that corresponds to one user ID and one system ID is "99.91%".

Next, the score calculation unit 22 refers to the score information 181 related to the resource information to obtain the score that corresponds to the extracted redundancy status 11e of "standby". Here, the score calculation unit 22 refers to the score information 181 that is related to the resource information and that is illustrated in FIG. 9 to obtain 1 point as a score. This is because the resource that is a task object is "standby" and it is determined that there is no possibility that a user is affected during a task on the resource.

The score calculation unit 22 then refers to the score information 183 related to the performance information to obtain the score that corresponds to, for example, the extracted CPU utilization 13c of "1%". Here, the score calculation unit 22 refers to the score information 183 that is related to the performance information and that is illustrated in FIG. 11 to obtain 1 point as a score. This is because the CPU utilization of the resource that is a task object is "1%" and it is determined that there is no possibility that a user is affected during a task on the resource.

The score calculation unit 22 then refers to the score information 185 related to the incident information to obtain the score that corresponds to the extracted effect time 15g. Here, the score calculation unit 22 refers to the score information 185 that is related to the incident information and that is illustrated in FIG. 13 and, as there are no past incidents, obtains 0 point as a score. This is because there are no past incidents on the resource that is a task object and it is determined that there is no possibility that a user is affected during a task on the resource.

The score calculation unit 22 then refers to the score information 186 related to the release information, and obtains the score that corresponds to the effect time 16g of "10 minutes". Here, as illustrated in FIG. 14, the score calculation unit 22 obtains 1 point as a score. This is because the effect time of the release for the resource is "10 minutes" and it is determined that there is no possibility that a user is affected during a task on the resource.

The score calculation unit 22 then refers to the score information 182 related to the user information to obtain the score that corresponds to the retrieved number of users "60" who are using the resource that is a task object. Here, the score calculation unit 22 refers to the score information 182 that is related to the user information and that is illustrated in FIG. 10 to obtain 2 points as a score. This is because 60 users are using the resource that is a task object and it is determined that there is a possibility that the users are affected during a task on the resource.

The score calculation unit 22 refers to the score information 184 related to the billing information to obtain the score that corresponds to the extracted billing amount 14e of "510 thousand". Here, the score calculation unit 22 refers to the score information 184 that is related to the billing information and that is illustrated in FIG. 12 to obtain 2 points as a score. This is because one user is a major customer whose usage corresponds to 510 thousand yen and it is determined that there is a possibility that the user, the major customer, is affected during a task on the resource.

The score calculation unit 22 then refers to the score information 187 related to the SLA information to obtain the score that corresponds to the extracted operating rate 17d of "99.91%". Here, the score calculation unit 22 refers to the score information 187 that is related to the SLA information and that is illustrated in FIG. 15 to obtain 3 points as a score. This is because the compliance state of the SLA for one user is low and it is determined that the user is largely affected during a task on the resource.

The score calculation unit 22 then sums the score that is obtained as a score with respect to each piece of configuration information. Here, the score calculation unit 22 obtains "10 points" for the degree of effect on a user due to a task on the resource that is a task object. The effect analysis unit 23 then uses the summary result and the threshold in the threshold information 19 to analyze the effect on a user due to a task on the resource that is a task object. Here, by referring to the threshold information 19 illustrated in FIG. 16, the effect analysis unit 23 is capable of determining that the degree of effect that corresponds to the summary result of "10 points" is "high".

Returning to FIG. 1, the score-information update unit 25 updates the reference value in the score information 18 on a user in accordance with the tendency of the information on the user. Here, the score information 18 on a user means, for example, the score information 182 related to the user information, the score information 184 related to the billing information, and the score information 187 related to the SLA information. Furthermore, the reference value means the number of users 182a in the case of the score information 182 related to the user information, it means the billing amount 184a in the case of the score information 184 related to the billing information, and it means the operating rate 187a in the case of the score information 187 related to the SLA information. The score-information update unit 25 may be executed on a regular basis, for example, during a monthly operation, or may be executed irregularly.

For example, with respect to each user, the score-information update unit 25 sums user-related information (the user information 12, the billing information 14, and the SLA information 17) during a monthly operation. The score-information update unit 25 then compares the summary result of summary during the monthly operation with the summary result of the previous month to analyze the tendency. If the analyzed tendency is an increasing tendency, the score-information update unit 25 increases the reference value of the score information 18 (the score information 182 related to the user information, the score information 184 related to the billing information, and the score information 187 related to the SLA information) that has an increasing tendency. Conversely, if the analyzed tendency is a decreasing tendency, the score-information update unit 25 decreases the reference value of the score information 18 that has a decreasing tendency.

For example, the score-information update unit 25 uses the billing information 14 to sum the billing amount 14e with respect to each user during a monthly operation. The score-information update unit 25 then compares the billing amount, which is summed with respect to each user during a monthly operation, with the billing amount of the previous month so as to analyze the tendency. Here, if the billing amount (sales) of each user has an increasing tendency compared to that of the previous month, the score-information update unit 25 updates the billing amount 184a in the score information 184 related to the billing information so as to increase it. Conversely, if the billing amount (sales) of each user has a decreasing tendency compared to that of the previous month, the score-information update unit 25 updates the billing amount 184a in the score information 184 related to the billing information so as to decrease it.

FIG. 18 is a table that illustrates an example of an update to the score information related to the billing information. As illustrated in FIG. 18, for example, if the billing amount (sales) of each user has an increasing tendency compared to that of the previous month, the score-information update unit 25 updates the billing amount 184a in the score information 184 related to the billing information so as to increase it. In the example of FIG. 18, the billing amount 184a that corresponds to the score 184b of "1" is updated from "less than 0.5 million" to "less than 1 million". The billing amount 184a that corresponds to the score 184b of "2" is updated from "equal to or more than 0.5 million and less than 1 million" to "equal to or more than 1 million and less than 1.5 million". The billing amount 184a that corresponds to the score 184b of "3" is updated from "equal to or more than 1 million" to "equal to or more than 1.5 million".

FIG. 19 is a table that illustrates an example of an update to the score information related to the user information. As illustrated in FIG. 19, for example, if the number of users has an increasing tendency compared to that of the previous month, the score-information update unit 25 updates the number of users 182a in the score information 182 related to the user information so as to increase it. In the example of FIG. 19, the number of users 182a that corresponds to the score 182b of "1" is updated from "less than 50" to "less than 100". The number of users 182a that corresponds to the score 182b of "2" is updated from "equal to or more than 50 and less than 100" to "equal to or more than 100 and less than 500". The number of users 182a that corresponds to the score 182b of "3" is updated from "equal to or more than 100" to "equal to or more than 500".

Figures 20, 21:
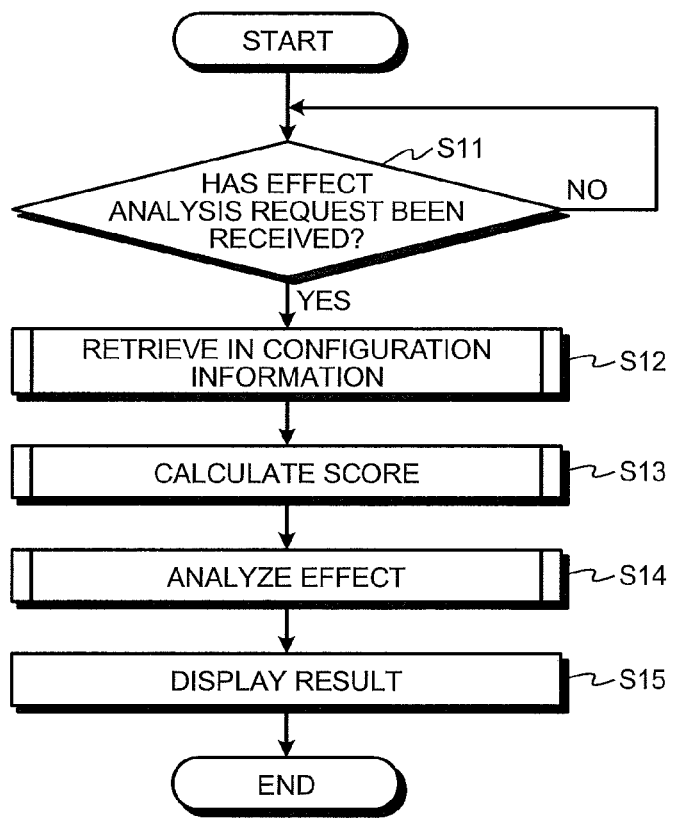
FIG. 20 is a table that illustrates an example of an update to the score information related to the SLA information.
FIG. 21 is a flowchart that illustrates the steps of an effect analysis operation according to the embodiment.

FIG. 20 is a table that illustrates an example of an update to the score information related to the SLA information. As illustrated in FIG. 20, for example, if the compliance state of the SLA of each user has an increasing tendency compared to that of the previous month, the score-information update unit 25 updates the operating rate 187a in the score information 187 related to the SLA information so as to increase it. In the example of FIG. 20, the operating rate 187a that corresponds to the score 187b of "1" is updated from "equal to or more than 99.95" to "equal to or more than 99.995". The operating rate 187a that corresponds to the score 187b of "2" is updated from "equal to or more than 99.9 and less than 99.95" to "equal to or more than 99.99 and less than 99.995". The operating rate 187a that corresponds to the score 187b of "3" is updated from "less than 99.9" to "less than 99.99".

Steps of Effect Analysis Operation

Next, an explanation is given, with reference to FIG. 21, of the steps of an effect analysis operation according to the embodiment. FIG. 21 is a flowchart that illustrates the steps of an effect analysis operation according to the embodiment.

First, the control unit 20 determines whether an effect analysis request with respect to the resource that is a task object has been received (Step S11). If it is determined that an effect analysis request with respect to the resource that is a task object has not been received (Step S11; No), the control unit 20 repeats a determination operation.

Conversely, it is determined that an effect analysis request with respect to the resource that is a task object has been received (Step S11; Yes), the control unit 20 causes the configuration-information retrieval unit 21 to perform a configuration-information retrieval operation so as to retrieve, from each piece of configuration information, the information that is associated with the resource (Step S12). Then, the score calculation unit 22 performs a score calculation operation on the information that is retrieved during the configuration-information retrieval operation (Step S13).

Then, the effect analysis unit 23 uses the score that is calculated during the score calculation operation to perform an effect analysis operation (Step S14). Afterward, the result display unit 24 displays, on the output unit 40, the result of analysis during the effect analysis operation (Step S15).

Steps of Configuration-Information Retrieval Operation

Figure 22:
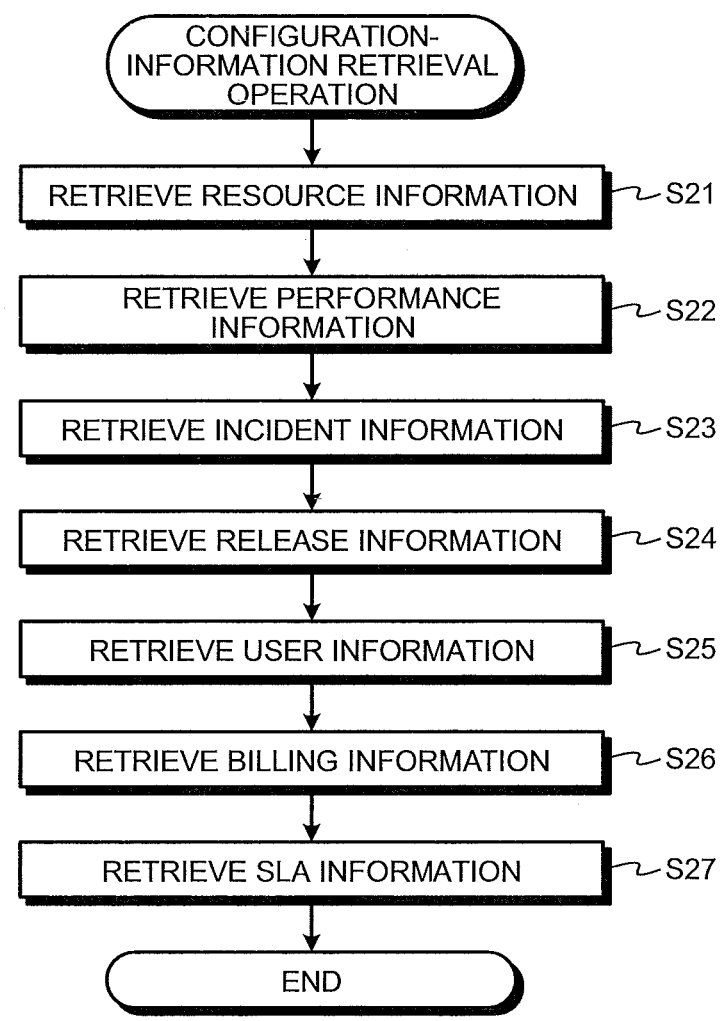
FIG. 22 is a flowchart that illustrates the steps of a configuration-information retrieval operation according to the embodiment.

Next, an explanation is given, with reference to FIG. 22, of the steps of the configuration-information retrieval operation according to the embodiment. FIG. 22 is a flowchart that illustrates the steps of the configuration-information retrieval operation according to the embodiment. It is assumed that the configuration-information retrieval unit 21 receives, from the control unit 20, the name of the resource that is a task object.

After receiving the name of the resource that is a task object, the configuration-information retrieval unit 21 retrieves the resource information 11 to acquire the record that corresponds to the name of the resource (Step S21). The configuration-information retrieval unit 21 then extracts, from the acquired record, the resource ID 11b and the redundancy status 11e. Then, the configuration-information retrieval unit 21 retrieves the performance information 13 to acquire the record that corresponds to the extracted resource ID 11b (Step S22). The configuration-information retrieval unit 21 then extracts, for example, the CPU utilization 13c from the acquired record. The configuration-information retrieval unit 21 may extract the memory utilization 13d instead of the CPU utilization 13c from the acquired record.

The configuration-information retrieval unit 21 retrieves the incident information 15 to acquire the record that corresponds to the extracted resource ID 11b (Step S23). The configuration-information retrieval unit 21 extracts the effect time 15g from the acquired record. The configuration-information retrieval unit 21 then retrieves the release information 16 to acquire the record that corresponds to the extracted resource ID 11*b* (Step S24). The configuration-information retrieval unit 21 then extracts the effect time 16*g* from the acquired record.

Next, the configuration-information retrieval unit 21 retrieves the user information 12 to acquire the record that corresponds to the extracted resource ID 11*b* (Step S25). The configuration-information retrieval unit 21 then acquires the number of acquired records as the number of users. Furthermore, the configuration-information retrieval unit 21 extracts the user ID 12*b* and the system ID 12*c* from the acquired record.

The configuration-information retrieval unit 21 retrieves the billing information 14 to acquire the record that corresponds to the user ID 12*b* and the system ID 12*c* that are extracted (Step S26). The configuration-information retrieval unit 21 extracts the billing amount 14*e* from the acquired record. The configuration-information retrieval unit 21 then retrieves the SLA information 17 to acquire the record that corresponds to the user ID 12*b* and the system ID 12*c* that are extracted (Step S27). The configuration-information retrieval unit 21 then extracts the operating rate 17*d* from the acquired record. The operation is then terminated.

Steps of Score Calculation Operation

Figure 23:
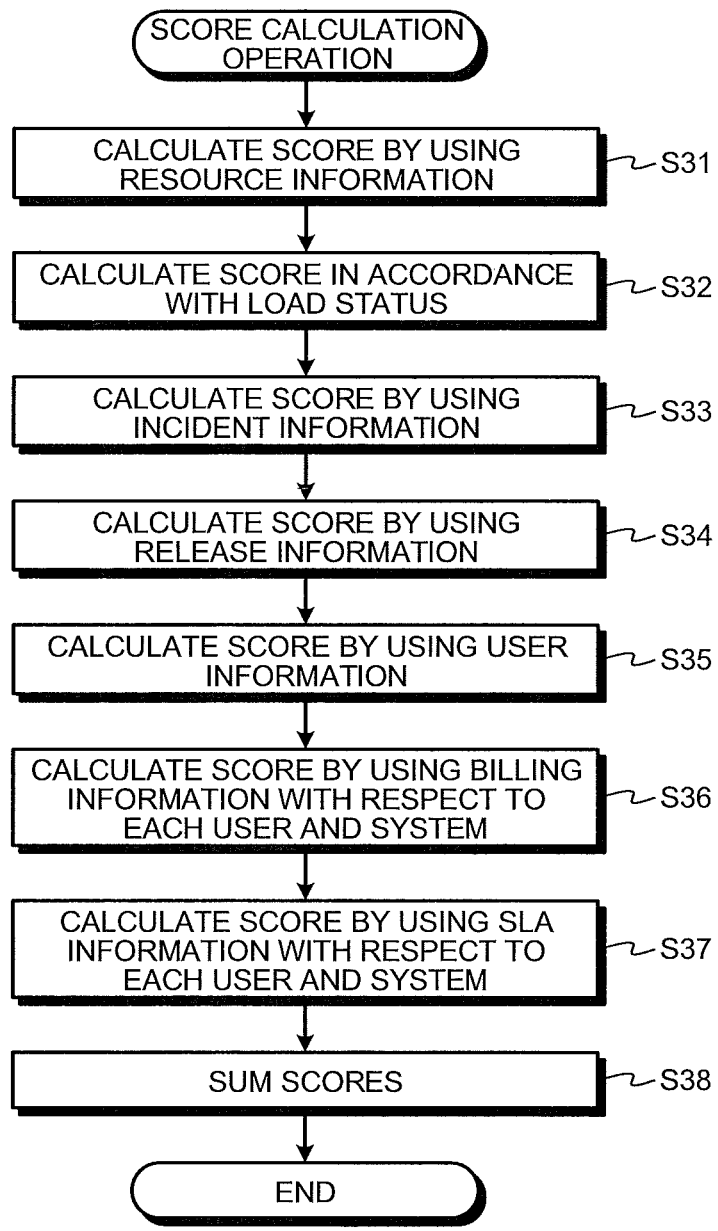
FIG. 23 is a flowchart that illustrates the steps of a score calculation operation according to the embodiment.

Next, an explanation is given, with reference to FIG. 23, of the steps of a score calculation operation according to the embodiment. FIG. 23 is a flowchart that illustrates the steps of the score calculation operation according to the embodiment. It is assumed that the score calculation unit 22 receives each piece of information that is extracted from each piece of configuration information by the configuration-information retrieval unit 21.

The score calculation unit 22 calculates a score by using the resource information (Step S31). Specifically, after the score calculation unit 22 receives the redundancy status that is extracted from the resource information 11 by the configuration-information retrieval unit 21, it refers to the score information 181 related to the resource information and obtains the score 181*b* that corresponds to the redundancy status.

Then, the score calculation unit 22 calculates a score in accordance with a load status (Step S32). Specifically, after the score calculation unit 22 receives the CPU utilization (or the memory utilization) that is extracted from the performance information 13 by the configuration-information retrieval unit 21, it refers to the score information 183 related to the performance information and obtains the score 183*b* that corresponds to the CPU utilization.

The score calculation unit 22 then calculates a score by using the incident information (Step S33). Specifically, after the score calculation unit 22 receives the effect time that is extracted from the incident information 15 by the configuration-information retrieval unit 21, it refers to the score information 185 related to the incident information and obtains the score 185*b* that corresponds to the effect time.

The score calculation unit 22 then calculates a score by using the release information (Step S34). Specifically, after the score calculation unit 22 receives the effect time that is extracted from the release information 16 by the configuration-information retrieval unit 21, it refers to the score information 186 related to the release information and obtains the score 186*b* that corresponds to the effect time.

Next, the score calculation unit 22 calculates a score by using the user information (Step S35). Specifically, after the score calculation unit 22 receives the number of users that is acquired from the user information 12 by the configuration-information retrieval unit 21, it refers to the score information 182 related to the user information and obtains the score 182*b* that corresponds to the number of users.

The score calculation unit 22 then calculates a score by using the billing information with respect to each of the user IDs and the system IDs (Step S36). Specifically, after the score calculation unit 22 receives the billing amount that is acquired from the billing information 14 by the configuration-information retrieval unit 21, it refers to the score information 184 related to the billing information and obtains the score 184*b* that corresponds to the billing amount. The score calculation unit 22 then sums the obtained scores with respect to each of the user IDs and the system IDs.

The score calculation unit 22 then calculates a score by using the SLA information with respect to each of the user IDs and the system IDs (Step S37). Specifically, after the score calculation unit 22 receives the operating rate that is acquired from the SLA information 17 by the configuration-information retrieval unit 21, it refers to the score information 187 related to the SLA information and obtains the score 187*b* that corresponds to the operating rate. The score calculation unit 22 then sums the obtained scores with respect to each of the user IDs and the system IDs.

The score calculation unit 22 then sums the score that is calculated with respect to each piece of configuration information (Step S38). The summed score is the score that corresponds to the resource that is a task object. The operation is then terminated.

Steps of Score Calculation Operation on Billing Information

Figure 24:
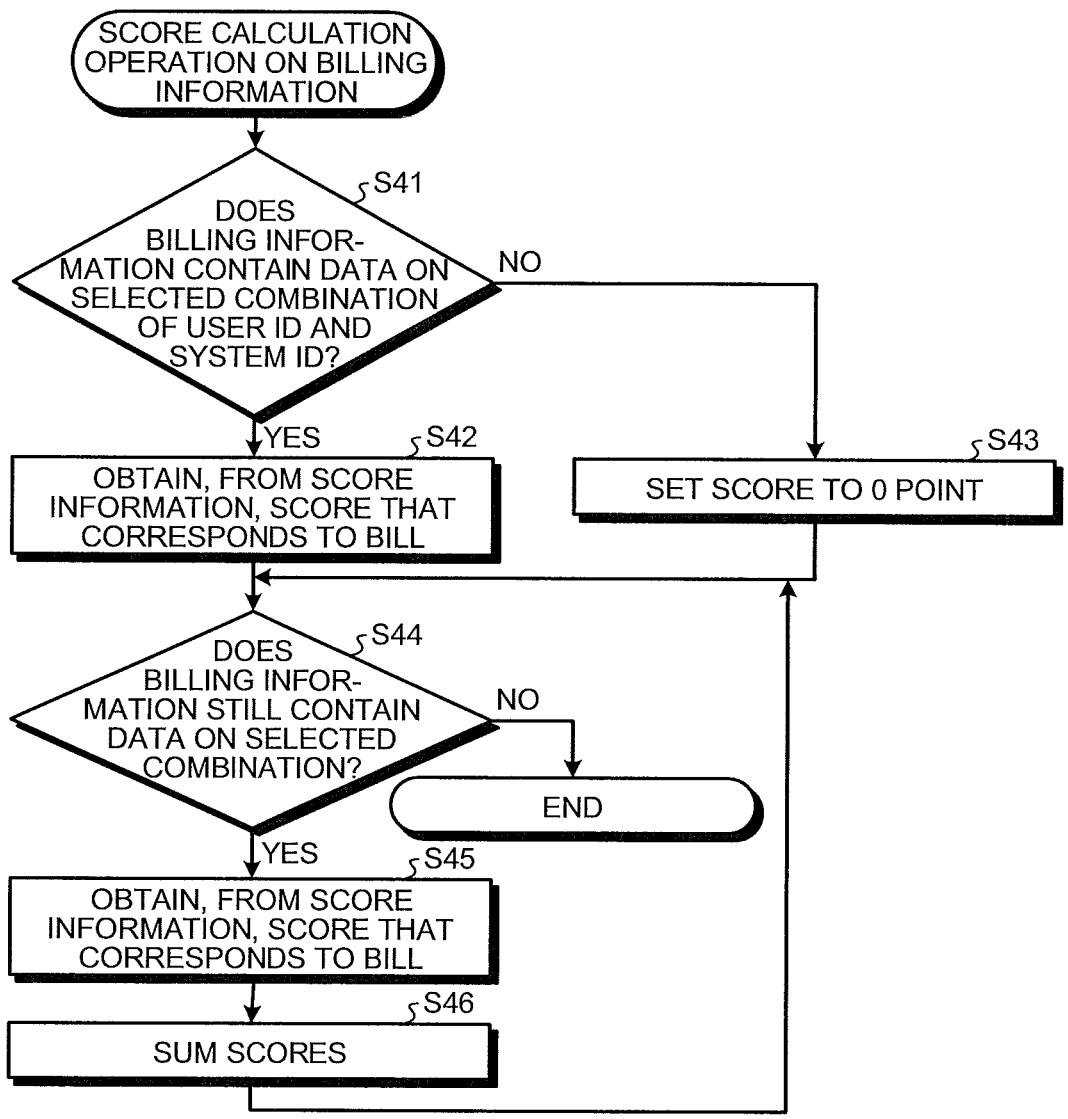
FIG. 24 is a flowchart that illustrates the steps of the score calculation operation on the billing information.

Next, the steps of a score calculation operation on the billing information are explained with reference to FIG. 24 as an example of the score calculation operation. FIG. 24 is a flowchart that illustrates the steps of the score calculation operation on the billing information. It is assumed that the score calculation unit 22 selects a single combination of a user ID and a system ID for using the resource that is a task object.

The score calculation unit 22 determines whether the billing information 14 contains data on the selected combination of the user ID and the system ID (Step S41). For example, the score calculation unit 22 determines whether the billing information 14 retrieved by the configuration-information retrieval unit 21 contains data on the billing amount that corresponds to the user ID and system ID that are selected.

If it is determined that there is data on the billing amount with the user ID and the system ID that are selected (Step S41; Yes), the score calculation unit 22 obtains, from the score information, the score that corresponds to the bill (Step S42). For example, the score calculation unit 22 refers to the score information 184 related to the billing information and obtains the score 184*b* that corresponds to the billing amount with the user ID and the system ID that are selected.

Conversely, if it is determined that there is no data on the billing amount with the user ID and the system ID that are selected (Step S41; No), the score calculation unit 22 sets the score to 0 point (Step S43).

The score calculation unit 22 then determines whether the billing information 14 still contains data on the selected combination (Step S44). If it is determined that there is still data on the selected combination (Step S44; Yes), the score calculation unit 22 obtains, from the score information, the score that corresponds to the bill (Step S45). For example, the score calculation unit 22 refers to the score information 184 related to the billing information and obtains the score 184b that corresponds to the billing amount of the selected combination.

The score calculation unit 22 then sums the scores (Step S46). The score calculation unit 22 then proceeds to Step S44 so as to determine whether there is still data on the same combination.

At Step S44, if it is determined that there is no data on the selected combination (Step S44; No), the score calculation unit 22 terminates the operation on the selected combination of the user ID and the system ID. Then, the score calculation unit 22 selects the next combination of a user ID and a system ID and performs an operation on the selected combination.

Steps of Effect Analysis Operation

Figure 25:
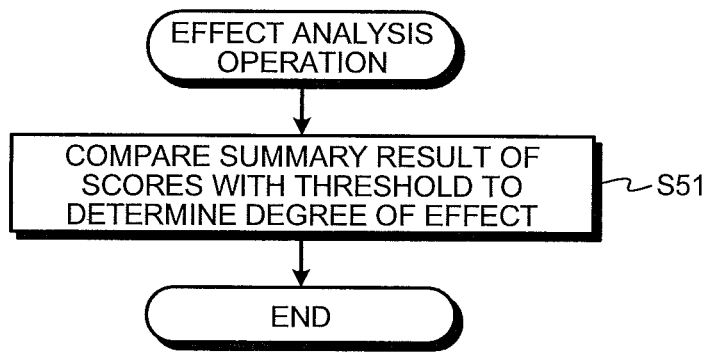
FIG. 25 is a flowchart that illustrates the steps of the effect analysis operation according to the embodiment.

Next, an explanation is given, with reference to FIG. 25, of the steps of an effect analysis operation according to the embodiment. FIG. 25 is a flowchart that illustrates the steps of the effect analysis operation according to the embodiment. It is assumed that the effect analysis unit 23 receives the summary result of scores from the score calculation unit 22.

After receiving the summary result of scores, the effect analysis unit 23 compares the received summary result of scores with a threshold to determine the degree of effect (Step S51). Specifically, the effect analysis unit 23 refers to the threshold information 19 to determine the degree of effect on a user due to a task on the resource that is a task object. The operation is then terminated.

Steps of Score-Information Update Operation

Figure 26:
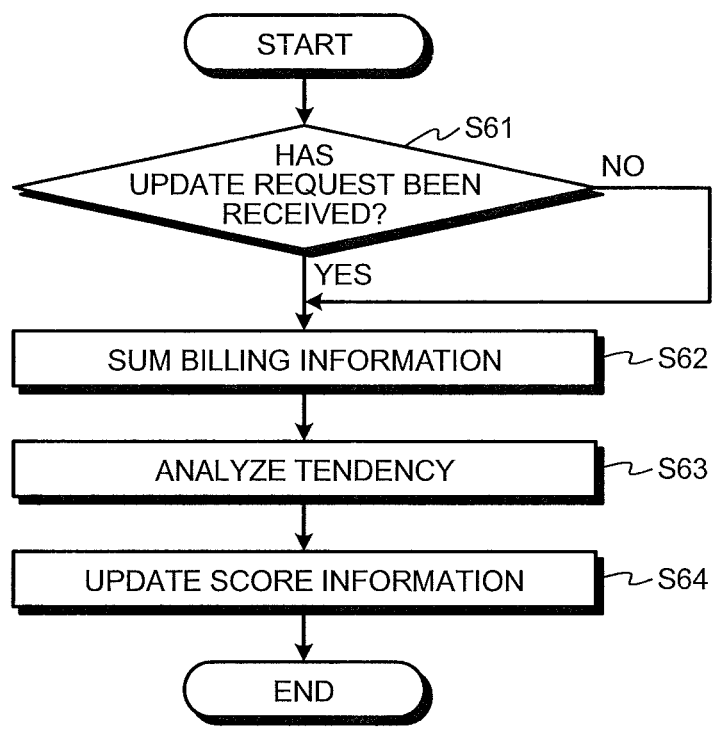
FIG. 26 is a flowchart that illustrates the steps of an operation to update the score information related to the billing information.

Next, the steps of an operation to update the score information related to the billing information are explained with reference to FIG. 26 as an example of a score-information update operation. FIG. 26 is a flowchart that illustrates the steps of the operation to update the score information related to the billing information.

First, the score-information update unit 25 determines whether a request to update the score information 184 related to the billing information has been received (Step S61). If it is determined that a request to update the score information 184 related to the billing information has not been received (Step S61; No), the score-information update unit 25 repeats a determination operation.

Conversely, if it is determined that a request to update the score information 184 related to the billing information has been received (Step S61; Yes), the score-information update unit 25 sums the billing information (Step S62). For example, during a monthly operation, the score-information update unit 25 uses the billing information 14 to sum the billing amount 14e with respect to each user.

The score-information update unit 25 then analyzes the tendency (Step S63). For example, the score-information update unit 25 compares the billing amount of the previous month with the billing amount that is summed with respect to each user during a monthly operation, thereby analyzing the tendency.

The score-information update unit 25 then updates the score information 184 related to the billing information (Step S64). For example, if the analyzed tendency is an increasing tendency compared to that of the previous month, the score-information update unit 25 updates the billing amount 184a in the score information 184 related to the billing information so as to increase it. Furthermore, if the analyzed tendency is a decreasing tendency compared to that of the previous month, the score-information update unit 25 updates the billing amount 184a in the score information 184 related to the billing information so as to decrease it.

After the score-information update unit 25 updates the score information 184 related to the billing information, the operation is terminated.

Figure 27:
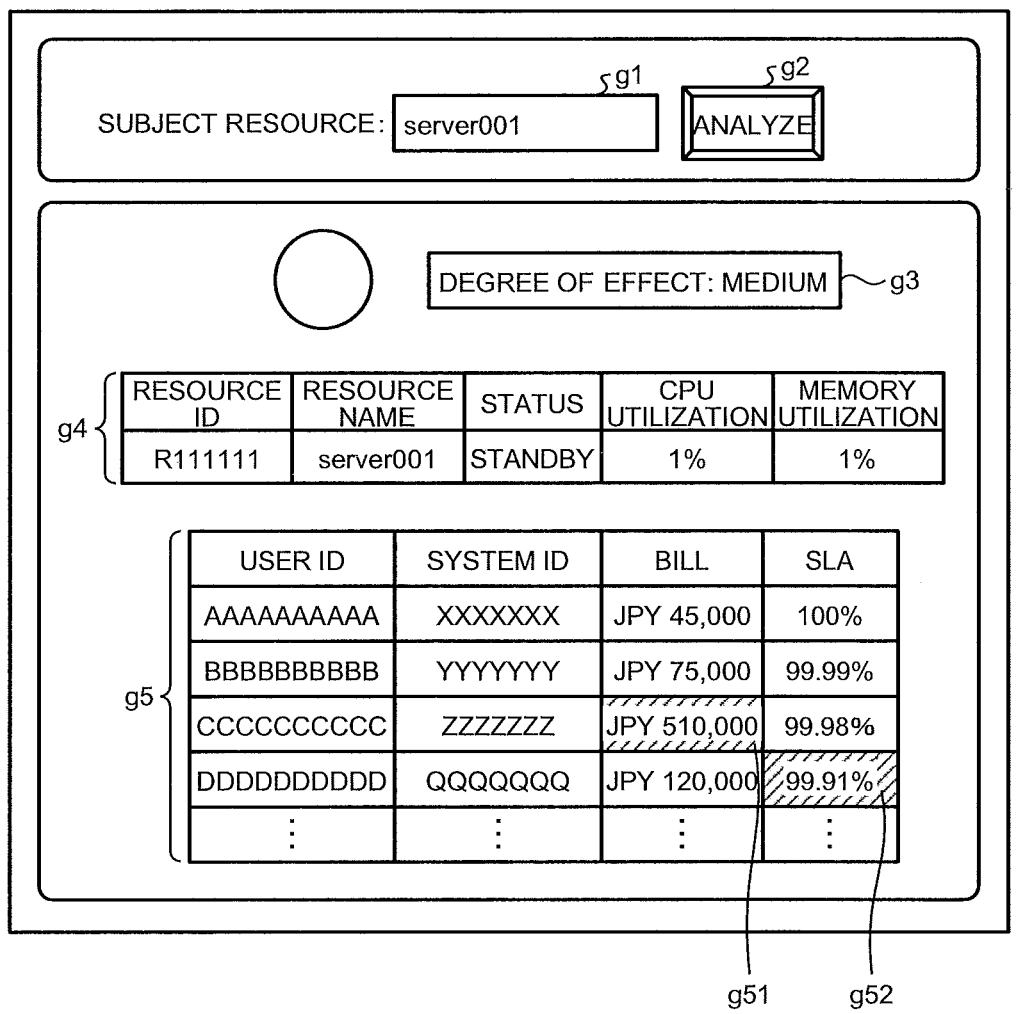
FIG. 27 is a diagram that illustrates an example of a screen that displays a determination result.

Next, an explanation is given, with reference to FIG. 27, of an example of the screen of the output unit 40 on which the result display unit 24 displays a determination result of a determination during the effect analysis operation. FIG. 27 is a diagram that illustrates an example of the screen that displays the determination result. As illustrated in FIG. 27, the screen of the output unit 40 displays a text box g1 and an analysis button g2. Furthermore, the screen of the output unit 40 displays a degree of effect g3 that is analyzed by the effect analysis unit 23, resource-related information g4, and user-related information g5.

The text box g1 is used to input the resource that is a task object. The analysis button g2 is used to perform an effect analysis operation on the subject resource that is input to the text box g1. When the analysis button g2 is pressed, the effect analysis operation is performed on the input subject resource. The result display unit 24 then displays the degree of effect g3, the resource-related information g4, and the user-related information g5 as a determination result on the output unit 40.

For example, the screen displays "server001" as the subject resource. Furthermore, "the degree of effect: medium" is displayed as the degree of effect g3. Moreover, the resource ID "R11111", the resource name "server001", the status "standby", the CPU utilization "1%", and the memory utilization "1%" are displayed as the resource-related information g4. The resource ID, the resource name, and the status that are indicated as the resource-related information g4 are the information that is retrieved from the resource information 11. The CPU utilization and the memory utilization that are indicated as the resource-related information g4 are the information that is retrieved from the performance information 13.

Furthermore, the bill and the SLA that correspond to the user ID and the system ID are displayed as the user-related information g5. Furthermore, the user ID and the system ID that are indicated as the user-related information g5 are the data that is retrieved from the user information 12. The bill that is indicated as the user-related information g5 is the data that is retrieved from the billing information 14. The SLA that is indicated as the user-related information g5 is the data that is retrieved from the SLA information 17.

Here, if the user ID is "CCCCCCCCCC" and the system ID is "ZZZZZZZ", the bill of "JPY 510,000" is displayed. With reference to FIG. 12, the bill (billing amount) is the amount that corresponds to the score of 2 points. Therefore, the result display unit 24 determines that there is a possibility that a user is affected and highlights it (g51). Specifically, the result display unit 24 assumes the factor that makes the degree of effect "medium" and highlights it.

Furthermore, if the user ID is "DDDDDDDDDD" and the system ID is "QQQQQQQ", the SLA of "99.91%" is displayed. With reference to FIG. 15, the SLA (operating rate) is the amount that corresponds to the score of 3 points. Therefore, the result display unit 24 determines that there is a possibility that a user is significantly affected and highlights it (g52). Specifically, the result display unit 24 assumes the factor that makes the degree of effect "medium" and highlights it.

Thus, before performing a task on the resource that is a task object, an operator is capable of determining the degree of effect on a user due to the task on the resource that is a task object and the factor thereof.

Advantage of Embodiment

According to the above-described embodiment, the management server 1 acquires, from the database that is used during an operation, the information on the resource that is a task object and the information on a user who uses the resource. The management server 1 then uses the acquired information on the resource and the information on the user to analyze the effect on the user due to a task on the resource that is a task object. Furthermore, the management server 1 outputs the analyzed effect together with the acquired information on the resource and the information on the user. With this configuration, the management server 1 automatically analyzes the effect on a user due to a task on the resource that is a task object and outputs a result. Therefore, an operator is capable of efficiently determining the effect on a user due to the task performed on a resource. Furthermore, the management server 1 is capable of analyzing the effect on a user due to a task on the resource that is a task object more efficiently by using the database that is used during an operation.

Furthermore, according to the above-described embodiment, with respect to each piece of information that is included in the information on a resource and the information on a user, the management server 1 refers to the score information 18 that has a previously obtained score for the effect on a user due to a task, and it obtains a score for the effect on a user due to a task with respect to each piece of acquired information. The management server 1 then sums the score that is obtained as a score with respect to each piece of information. The management server 1 then uses the summed score and a predetermined threshold to analyze the effect on a user due to a task. With this configuration, the management server 1 analyzes the effect on a user due to a task by using the score that is obtained as a score for the effect on the user due to the task with respect to each piece of information; therefore, it is capable of accurately analyzing the effect on a user due to a task.

Furthermore, according to the above-described embodiment, the management server 1 updates the score information 18 related to the information on a user in accordance with the tendency of the information on the user. With this configuration, the management server 1 is capable of analyzing the effect on a user due to a task on a resource in accordance with the tendency of the information on the user.

Program, and the Like

Furthermore, the management server 1 can be implemented by installing each of the above-described functions, such as the control unit 20 and the storage unit 10, in a known information processing apparatus, such as a personal computer or a workstation.

Furthermore, components of each device illustrated do not always need to be physically configured as illustrated in the drawings. Specifically, specific forms of separation and combination of each device are not limited to those depicted in the drawings, and a configuration may be such that all or some of them are functionally or physically separated or combined in an arbitrary unit depending on various types of loads or usage. For example, the configuration-information retrieval unit 21 and the score calculation unit 22 may be combined as a single unit. Furthermore, each of the configuration-information retrieval unit 21 and the score calculation unit 22 may be separated into functional units for each piece of configuration information. For example, it may be separated into functional units for each piece of configuration information, such as a functional unit that retrieves the resource information 11 and calculates a score by using the retrieved information or a functional unit that retrieves the user information 12 and calculates a score by using the retrieved information. Furthermore, the storage unit 10 for the resource information 11, or the like, may be connected via a network as an external device for the management server 1.

Figure 28:
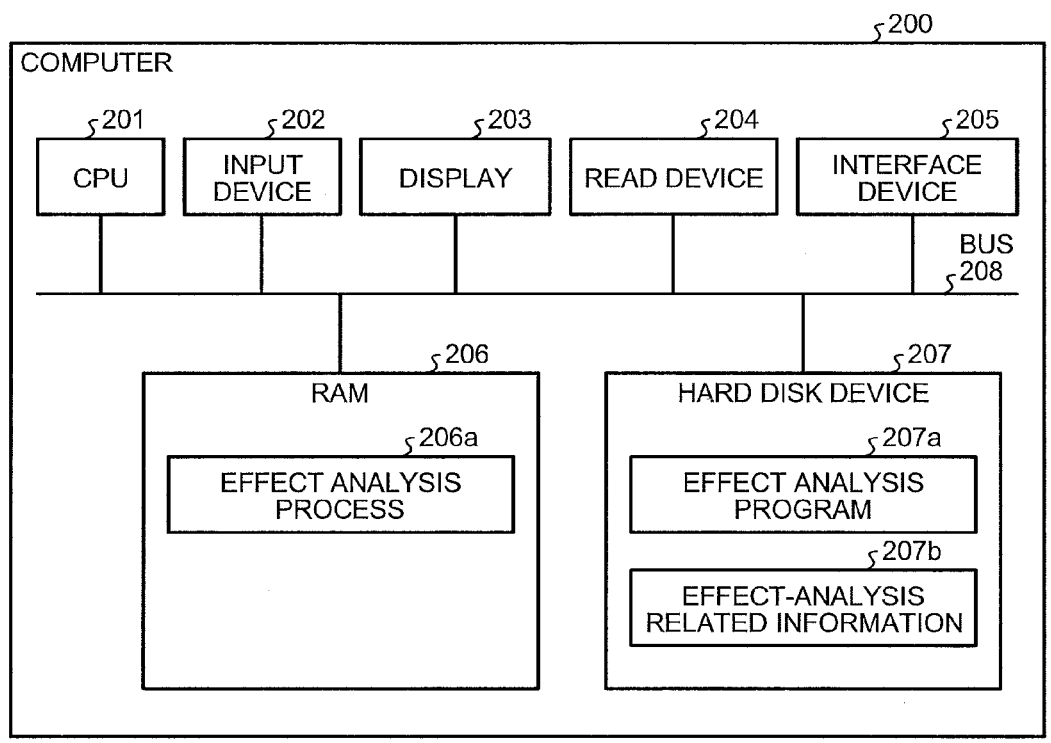
FIG. 28 is a diagram that illustrates an example of a computer that executes an effect analysis program.

Furthermore, various operations that are explained in the above-described embodiment may be performed when prepared programs are executed by a computer, such as a personal computer or workstation. An explanation is given below of an example of a computer that executes an effect analysis program for performing the same functionality as that of the management server 1 illustrated in FIG. 1. FIG. 28 is a diagram that illustrates an example of a computer that executes the effect analysis program.

As illustrated in FIG. 28, a computer 200 includes a CPU 201 that performs various calculation operations, an input device 202 that receives an input of data from a user, and a display 203. The computer 200 further includes a read device 204 that reads a program, or the like, from a storage medium and includes an interface device 205 that communicates data with a different computer via a network. Furthermore, the computer 200 includes a RAM 206 that temporarily stores various types of information and a hard disk device 207. Each of the devices 201 to 207 is connected to a bus 208.

The hard disk device 207 stores an effect analysis program 207a and an effect-analysis related information 207b. The CPU 201 reads the effect analysis program 207a and loads it in the RAM 206. The effect analysis program 207a functions as an effect analysis process 206a.

For example, the effect analysis process 206a corresponds to the configuration-information retrieval unit 21, the score calculation unit 22, the effect analysis unit 23, the result display unit 24, and the score-information update unit 25. The effect-analysis related information 207b corresponds to the resource information 11, the user information 12, the performance information 13, the billing information 14, the incident information 15, the release information 16, the SLA information 17, the score information 18, and the threshold information 19.

The effect analysis program 207a does not always need to be initially stored in the hard disk device 207. For example, the program is stored in a "portable physical medium" that is inserted into the computer 200, such as a flexible disk (FD), CD-ROM, DVD disk, magnetic optical disk, or IC card. The computer 200 may read the effect analysis program 207a from them to execute it.

According to an aspect of a program that is disclosed in the present application, it is possible for an operator to efficiently determine the effect on a user due to a task performed on a resource.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein an effect analyzing program causes a management device that manages a plurality of resources used by a user on a network to execute a process comprising:

extracting a value related to usage for a particular resource by referring to a first storage unit that stores values related to usage for the plurality of resources;

specifying a degree of effect on the user who uses the particular resource in response to the extracted value by referring to a second storage unit that stores each degree of effect on a user who uses a resource in case the resource is changed in response to each value related to usage, the degree of effect being represented by respective effect levels in accordance with respective values related to usage; and outputting the specified degree of effect in association with information that identifies the particular resource.

2. The non-transitory computer-readable recording medium according to claim 1, wherein the value related to usage refers to the number of users obtained from user information including user identification information used for identifying a user, a billing amount obtained from billing information including information on an amount charged to the user in association 2with the user identification information, or an operating rate obtained from SLA (Service Level Agreement) information including an operating rate for each of the plurality of resources, or any combination thereof.

3. An effect analyzing method performed by a management device that manages a plurality of resources used by a user on a network, the method comprising:

extracting a value related to usage for a particular resource by referring to a first storage unit that stores values related to usage for the plurality of resources using a processor;

specifying, a degree of effect on the user who uses the particular resource in response to the extracted value by referring to a second storage unit that stores each degree of effect on a user who uses a resource in case the resource is changed in response to each value related to usage, the degree of effect being represented by respective effect levels in accordance with respective values related to usage using the processor; and outputting the specified degree of effect in association with information that identifies the particular resource using the processor.

4. The effect analyzing method according to claim 3, wherein the value related to usage refers to the number of users obtained from user information including user identification information used for identifying a user, a billing amount obtained from billing information including information on an amount charged to the user in association with the user identification information, or an operating rate obtained from SLA (Service Level Agreement) information including an operating rate for each of the plurality of resources, or any combination thereof.

5. A management device that manages a plurality of resources used by a user on a network comprising:

a processor; and a memory, wherein the processor executes:

extracting a value related to usage for a particular resource by referring to a first storage unit that stores values related to usage for a plurality of resources;

specifying, a degree of effect on a user who uses the particular resource in response to the extracted value by referring to a second storage unit that stores each degree of effect on a user who uses a resource in case the resource is changed in response to each value related to usage, the degree of effect being represented by respective effect levels in accordance with respective values related to usage; and outputting the specified degree of effect in association with information that identifies the particular resource.

6. The management device according to claim 5, wherein the value related to usage refers to the number of users obtained from user information including user identification information used for identifying a user, a billing amount obtained from billing information including information on an amount charged to the user in association with the user identification information, or an operating rate obtained from SLA (Service Level Agreement) information including an operating rate for each of the plurality of resources, or any combination thereof.

* * * * *